United States Patent
Tomikawa et al.

[11] Patent Number: 5,903,387
[45] Date of Patent: May 11, 1999

[54] OPTICAL AXIS ADJUSTABLE BINOCULARS

[75] Inventors: Fumio Tomikawa, Sagamihara; Yasuo Yamazaki, Hino; Tetsuhisa Asai, Sagamihara, all of Japan

[73] Assignee: Olympus Optical Co., Ltd., Tokyo, Japan

[21] Appl. No.: 08/833,681

[22] Filed: Apr. 8, 1997

[30] Foreign Application Priority Data

Apr. 10, 1996 [JP] Japan ................................. 8-088518

[51] Int. Cl.$^6$ .................................................. G02B 23/00
[52] U.S. Cl. ........................................... 359/412; 359/418
[58] Field of Search .................................. 359/407, 408, 359/411, 412, 417, 418, 480, 481, 482

[56] References Cited

U.S. PATENT DOCUMENTS

| | | | |
|---|---|---|---|
| 2,205,764 | 6/1940 | Husar | 359/481 |
| 3,170,024 | 2/1965 | Dowling et al. | 359/417 |
| 3,914,012 | 10/1975 | Boughton | 359/375 |
| 4,886,340 | 12/1989 | Kanda | 359/411 |
| 5,206,757 | 4/1993 | Cheng et al. | 359/408 |
| 5,572,361 | 11/1996 | Kamiya et al. | 359/426 |
| 5,633,753 | 5/1997 | Fantone et al. | 359/412 |
| 5,640,271 | 6/1997 | Nishitani et al. | 359/412 |

*Primary Examiner*—Cassandra Spyrou
*Assistant Examiner*—Mark A. Robinson
*Attorney, Agent, or Firm*—Louis Weinstein

[57] ABSTRACT

Binoculars which can adjust the optical axes of optical systems by moving at least one lens groups of objective lens groups and eye piece groups in a plane approximately perpendicular to the optical axes of the lens groups and further independently adjust the optical axes of the optical systems in a linear direction and in the direction approximately perpendicular to the linear direction by moving, one lens groups of the objective lens groups and the eye piece groups on the plane approximately perpendicular to the optical axes of the lens groups approximately in the linear direction and moving the other lens groups of the objective lens groups and the eye piece groups on the plane approximately perpendicular to the optical axes of the lens groups approximately in the linear direction, whereby the optical axis between a pair of the right and left optical systems of the binoculars can be easily adjusted.

12 Claims, 12 Drawing Sheets

OPTICAL AXIS ADJUSTABLE BINOCULARS

BACKGROUND OF THE INVENTION

1. Field of the Invention

This invention relates to optical axis adjustable binoculars, and more specifically, to binoculars capable of adjusting the displacement of an optical axis caused between a pair of right and left optical systems.

2. Related Background Art

In general, there are conventionally employed arrangements for adjusting an optical axis by moving the position of a prism as a mechanism for adjusting the displacement of an optical axis caused between a pair of right and left optical systems in binoculars. For example, in binoculars employing Porro prisms, there is practically used an arrangement for adjusting the displacement of an optical axis caused between a pair of optical systems disposed on the right and the left side by sliding the prism in its long bide direction.

Further, in binoculars employing roof prisms, there is practically used an arrangement for adjusting the displacement of an optical axis caused between a pair of optical systems disposed on the right and the left side by moving the two prisms as a unit.

However, according to the conventional optical axis adjusting mechanisms in the binoculars as described above, a lot of manpower is required in manufacture because fine positional adjustment is necessary. Further, since there is also a problem that a skilled technology is necessary for jobs for adjustment, it is difficult to effectively adjust an optical axis.

SUMMARY OF THE INVENTION

A first object of this invention is to provide binoculars in which an optical axis between a pair of right and left optical systems can be easily adjusted.

A second object of this invention is to provide optical axis adjustable binoculars in which easy adjustment of an optical axis between a pair of right and left optical systems by a simple mechanism permits reduction of manufacturing manpower to thereby decrease manufacturing cost.

Further, a third object of this invention is to provide binoculars of a miniaturized size by minimizing an amount of adjustment necessary to adjust an optical axis by assembling optical axis adjusting mechanisms into lens barrels in which a pair of right and left optical systems are held.

Briefly, the present invention has a feature that the optical axes of optical systems are adjusted by moving at least one lens groups of objective lens groups and eye piece groups on the plane approximately perpendicular to the optical axes of the lens groups.

This invention has a feature that it includes lens group moving means for moving one lens groups of objective lens groups and eye piece groups on the plane approximately perpendicular to the optical axes of the lens groups in an approximately linear direction and moving the other lens groups on the plane approximately perpendicular to the optical axes of the lens groups in the direction approximately perpendicular to the linear direction to thereby independently adjust the optical axes of the optical systems in the linear direction and the direction approximately perpendicular to the linear direction.

This invention has a feature that it includes objective lens groups, eye piece groups, objective shafts for guiding the objective lens groups so that they can move along an optical axis direction as well as supporting the objective lens groups so that they rotate about the axes thereof, sliding means for sliding the eye piece groups in the direction approximately perpendicular to the axis of rotation of the objective lens groups and adjusting means for adjusting the optical axis of the optical systems as a whole by rotating the objective lens groups about the objective shafts and moving the eye piece groups by the sliding means.

With the above arrangement, the lens group moving means moves one of the groups of the objective lens groups and the eye piece groups on the plane approximately perpendicular to the optical axes of the lens groups in the approximately linear direction and further moving the other lens groups of the objective lens groups and the eye piece groups on the plane approximately perpendicular to the optical axes of the lens groups and in the direction approximately perpendicular to the above linear direction to thereby independently adjust the optical axes of the optical systems in the above linear direction and the direction approximately perpendicular to the linear direction.

Further, the sliding means slides the eye piece groups in the direction approximately perpendicular to the rotating direction of the objective lens groups, the objective shafts guide the objective lens groups so that they move along the optical axis direction as well as support the objective lens groups so that they rotate about the axes thereof, the adjusting means rotates the objective lens groups about the objective shafts and the sliding means moves the eye piece groups to thereby adjust the optical axis of the optical systems as a whole.

This and other objects and advantages of the present invention will become further apparent from the following detailed explanation.

According to this invention, binoculars in which an optical axis between a pair of right and left optical systems can be easily adjusted can be provided by a more simple mechanism at lower cost as well as reducing the size of the binoculars.

DETAILED DESCRIPTION OF THE PREFERRED EMBODIMENT

Figure 1:
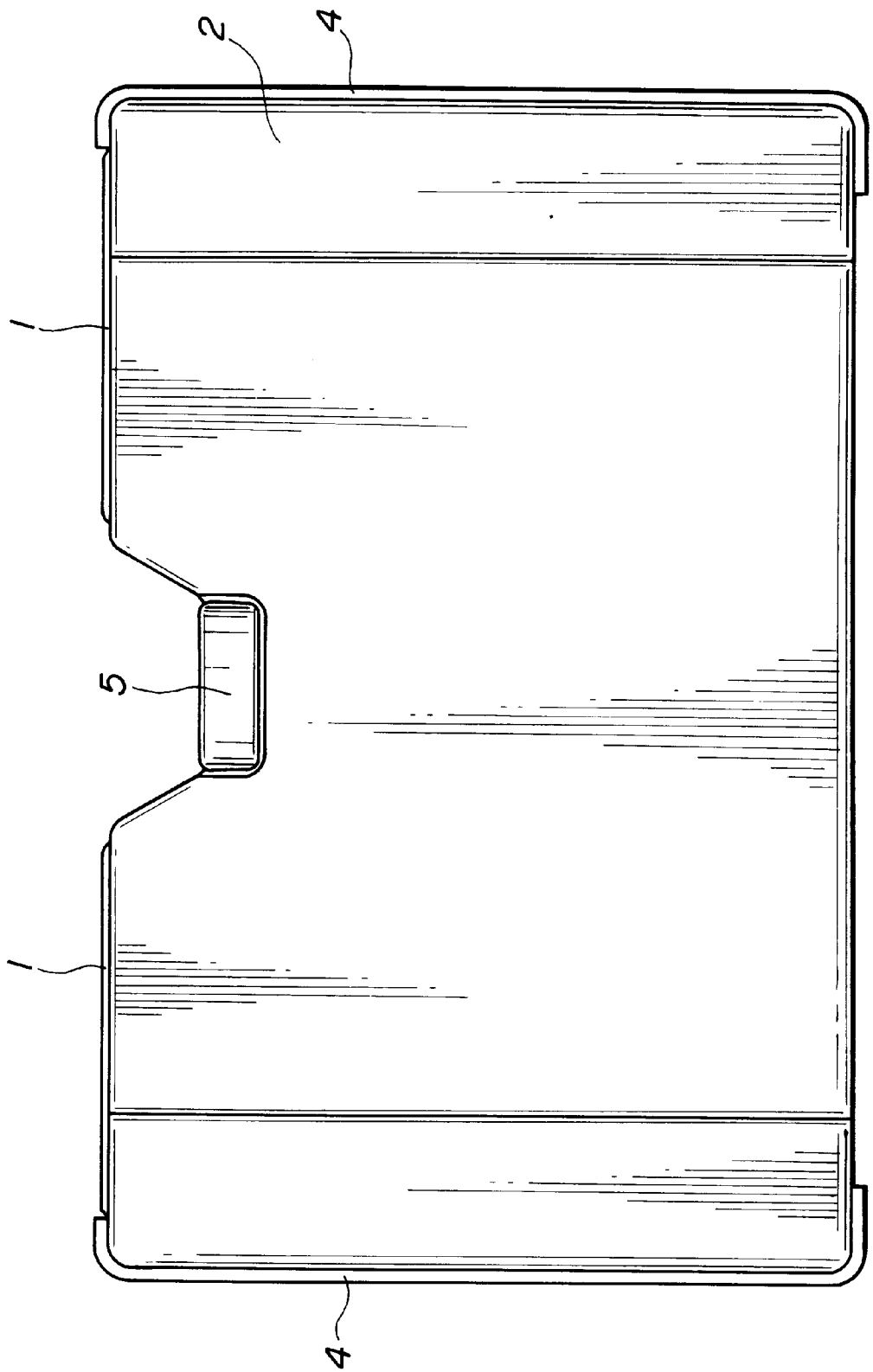
FIG. 1 is a plan view of a binoculars of an embodiment of this invention.

This invention will be described with reference to an embodiment shown in the drawings.

As shown in FIG. 1 to FIG. 5, binoculars of the embodiment of this invention is arranged such that a base plate 1 to which various internal mechanisms for forming a binocular main body are disposed is covered with an upper cover 2 from an upper side, a lower cover 3 from a lower side and side covers 4 from both sides, respectively.

The upper cover 2, the lower cover 3 and the like are composed of a material such as, for example, metal or the like to miniaturize the binoculars itself.

Figure 3:
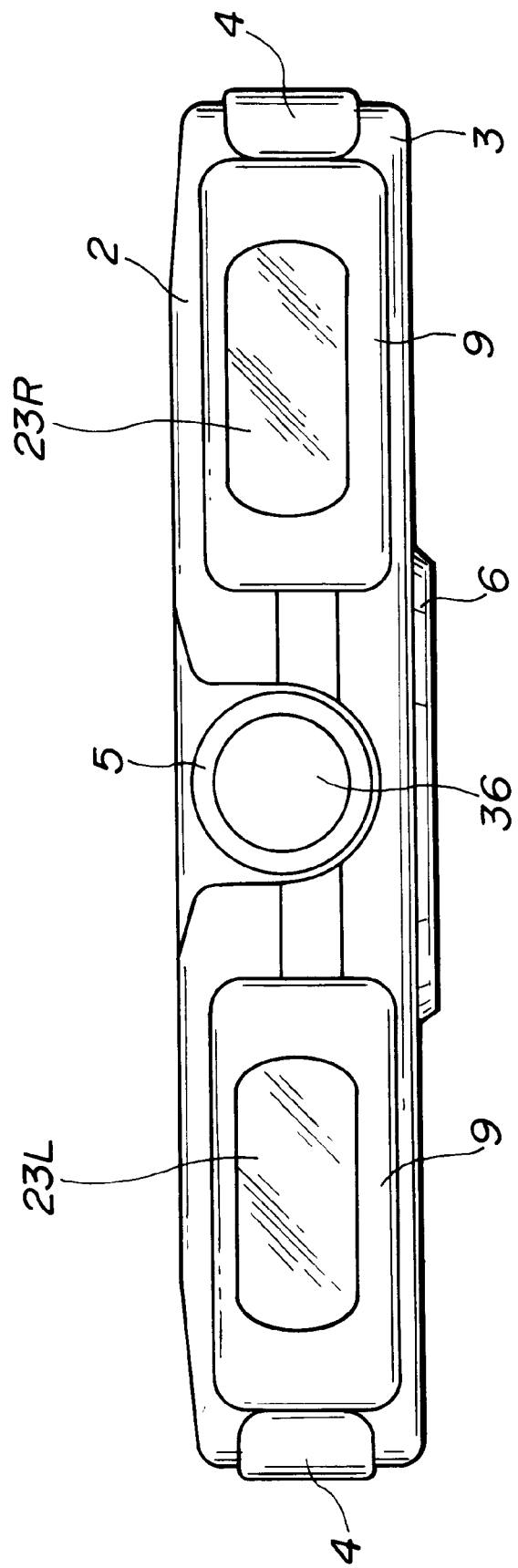
FIG. 3 is a rear elevational view of the binoculars of FIG. 1 (eye piece side)

As shown in FIG. 3, a distance adjusting knob 5 composed of a rotary actuating member for adjusting a focal point is rotatably disposed at approximately the center of the surface of the base plate 1 on the side thereof where eye piece groups 23 (L, R) are disposed and a distance lid 36 is disposed to an end surface of the distance adjusting knob 5.

Figure 4:
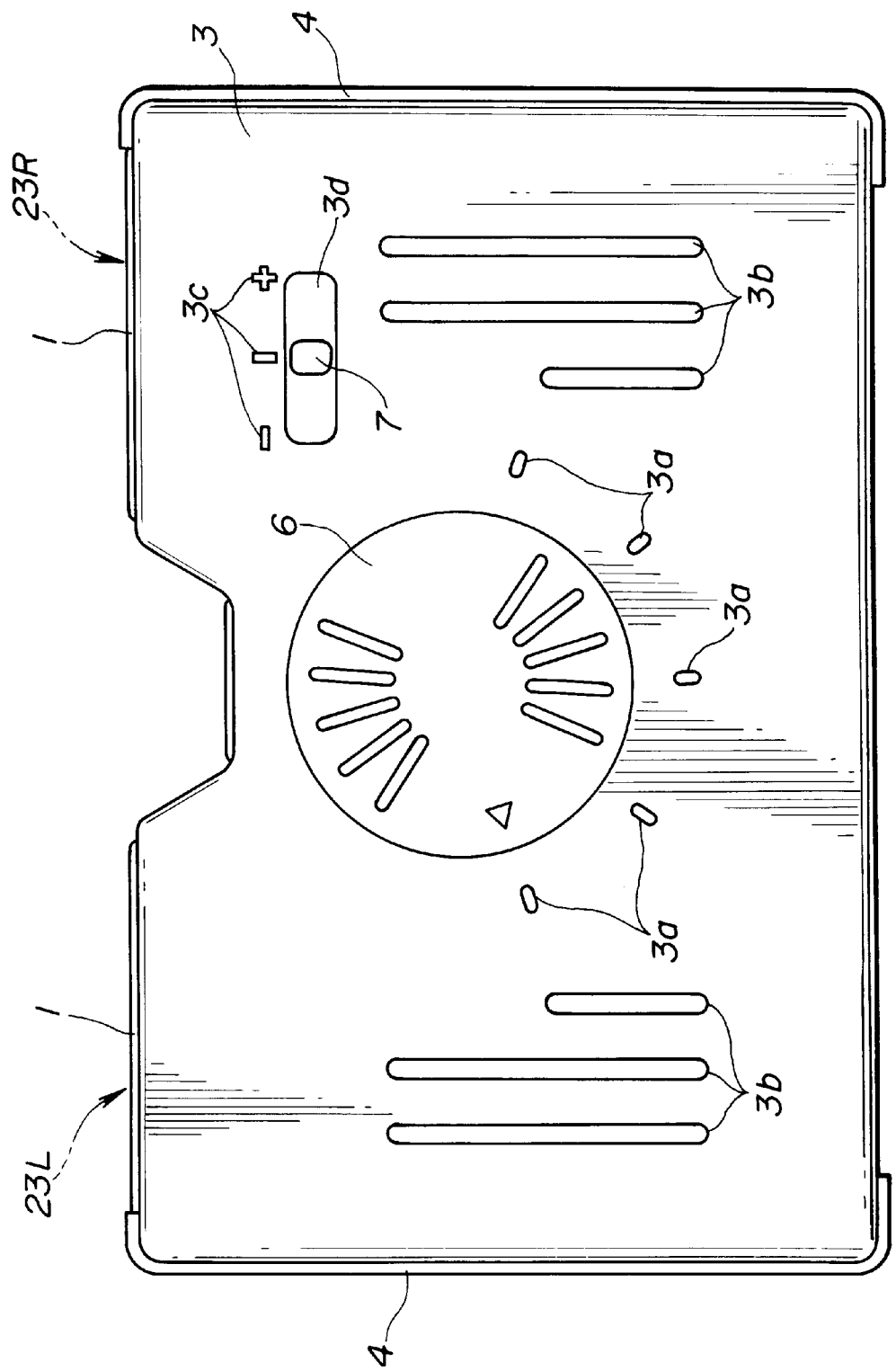
FIG. 4 is a bottom plan view of the binoculars of FIG. 1.

As shown in FIG. 4, a width-between-eyes adjusting knob 6 composed of a rotary actuating member for adjusting a width between eyes is disposed on the lower surface of the lower cover 3 approximately at the center thereof. A plurality of indexes 3a indicating a position of a width between eyes are formed around the center of the width-between-eyes adjusting knob 6 from the center thereof by marking or the like in radial directions on lower cover 3.

A plurality of line-shaped ridges 3b are disposed on the lower surface of the lower cover 3 on opposite sides of the width-between-eyes adjusting knob 6. Ridges 3b are formed to enhance the portability and holding property of the binoculars by permitting fingers to securely hold the binoculars through them.

A hole 3d is defined to the lower surface of the lower cover 3 on one side thereof (on the side where the eye piece group 23R for the right eye are disposed) and a diopter knob 7 composed of a sliding type actuating member for adjusting diopter is slidingly disposed to the hole 3d in a direction perpendicular to an optical axis. Then, indexes 3c indicating "+ (plus side)," "– (minus side)," "| (reference position)" and the like are formed by marking or the like on the lower cover 3 in the vicinity of the diopter knob 7.

Figure 2:
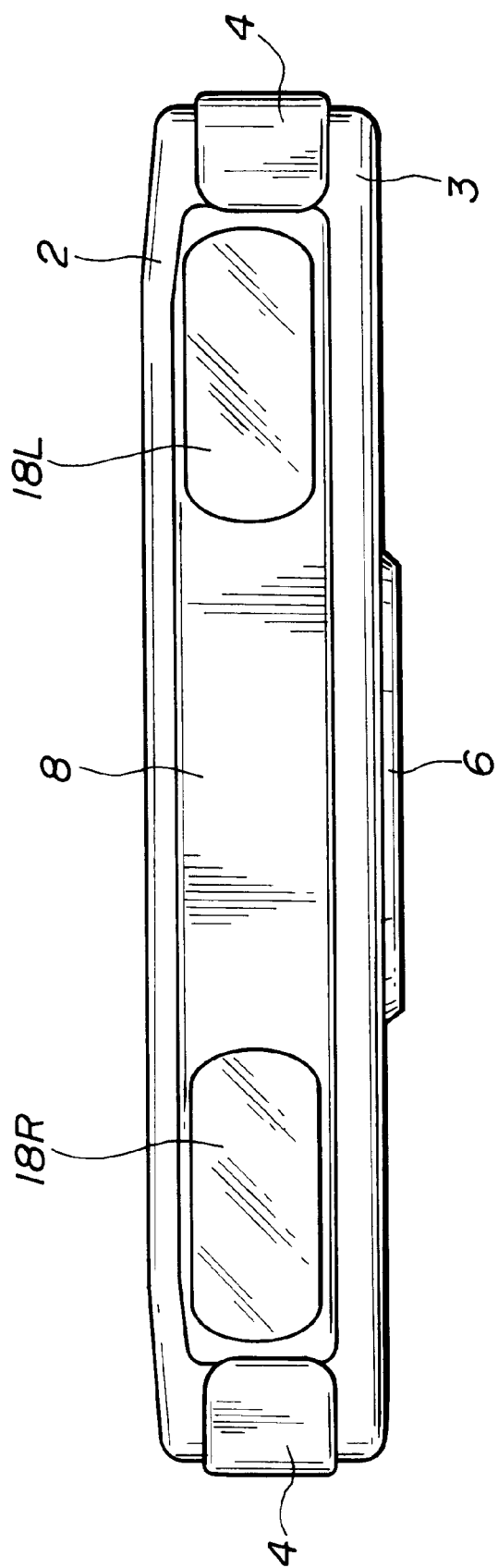
FIG. 2 is a front elevational view of the binoculars of FIG. 1 (objective lens side)

As shown in FIG. 2, a front cover 8 composed of a transparent protection member or the like is disposed to the surface of the binoculars on the side thereof where objective lens groups 18 (L, R) are disposed so as to cover the front surface of the binoculars including the objective lens groups 18. The front cover 8 prevents the invasion of dust, foreign substances and the like into the binoculars from the outside of the front thereof (objective lenses side).

Likewise, as shown in FIG. 3, a rear cover 9 composed of a transparent protection member or the like similar to the front cover 8 is disposed to the surface of the binoculars on the side thereof where the eye piece groups 23 (L, R) are disposed so as to cover the surface of the binoculars including the eye piece groups 23. The rear cover 9 prevents the invasion of dust, foreign substances and the like into the binoculars from the outside of the backside thereof (eye pieces side).

Figure 5:
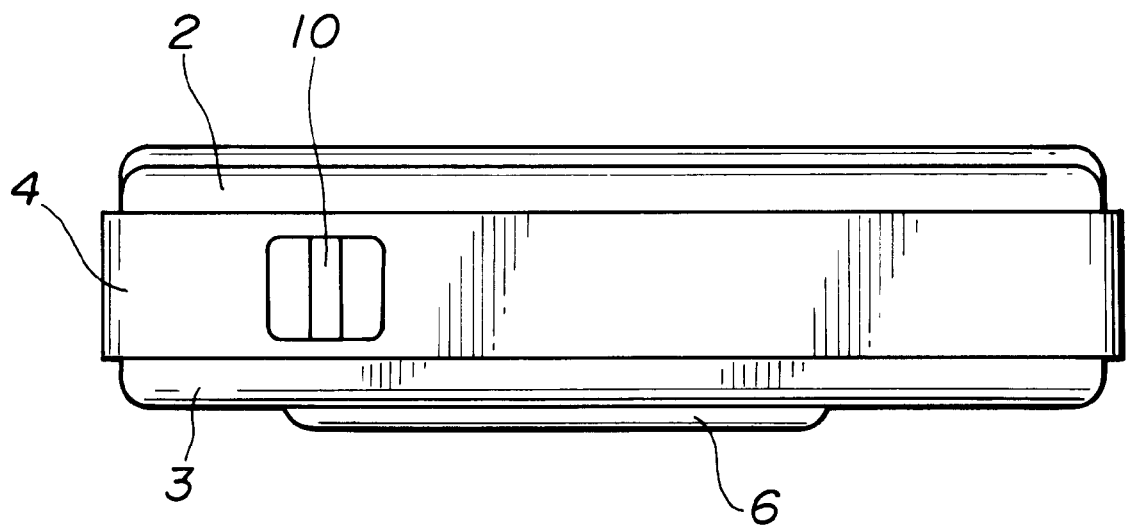
FIG. 5 is a side elevational view of the binoculars of FIG. 1.

As shown in FIG. 5, suspension lugs 10 are disposed on both the side surfaces of binoculars to attach a strap or the like for carrying the binoculars. The binoculars have an outside appearance arranged as described above.

Next, an inside arrangement of the binoculars will be described below with reference to FIG. 6 to FIG. 12. Note, FIG. 12 which is an exploded perspective view of the objective lens frames and shows only one of the frames, i.e. objective lens frame 17L on one side of the binoculars and the other of objective lens frame 17R on the other side of the binoculars is omitted for simplicity. This is because the objective lens frame 17R on the other side has a configuration symmetrical to that of the objective lens frame 17L on the one side and is basically arranged similarly to it.

First, optical systems of the binoculars will be described below.

A pair of right and left lens barrels 11 (L, R) for holding and protecting the optical systems of the binoculars are composed of a material of, for example, metal, resin or the like. Further, the pair of right and left lens barrels 11 (L, R) are composed of three blocks, that is, lens barrel objective units including the objective lens groups 18 (L, R), the objective lens frames 17 (L, R) and the like, lens barrel main bodies 12 (L, R), and lens barrel eye piece units including the eye piece groups 23 (L, R), eye piece frames 22 (L, R) and the like.

First prisms 13 (L, R) and second prisms 14 (L, R) are disposed to the lens barrel main bodies 12 (L, R), respectively and fixed to predetermined positions in the lens barrel main bodies 12 (L, R) by prism receivers 15, prism springs 16 and the like.

The objective lens frames 17 (L, R) which form the lens barrel objective units are disposed to the front sides of the lens barrel main bodies 12, i.e. on an object side and the objective lens groups 18 (L, R) each composed of a plurality of oval lenses and the like are held by the objective lens frames 17 (L, R).

The objective lens frames 17 (L, R) extend in the same direction as the optical axis direction of the optical systems and are rotatably supported on objective shafts 19 (L, R) as focusing support shafts disposed in the lens barrel main bodies 12 (L, R) so as to slide in the optical axis direction.

One of the objective shafts 19 (L, R), i.e. the objective shaft 19L is fitted to a hole defined to the lens barrel main body 12L at the extreme end on one end thereof (on the objective lens group 18L side) through a T-shaped collar 20 as well as fitted to a hole defined to the lens barrel main body 12L at the extreme end on the other end thereof (on the eye piece 23L side). This arrangement permits the lens barrel objective unit (objective lens frame 17L) to move in the optical axis direction by a predetermined amount.

Further, contrary to the objective shaft 19L, the other of the objective shafts 19 (L, R), i.e. the objective shaft 19R is fitted to a hole defined to the lens barrel main body 12R at the extreme end on one end thereof (on the objective lens 18R side) as well as fitted to a hole defined to the lens barrel main body 12R through a T-shaped collar 20 at the extreme end on the other end thereof (on the eye piece 23 side). This arrangement permits the lens barrel objective unit (objective lens frame 17R) to move in the optical axis direction by a predetermined amount.

Objective springs 21 (L, R) are wound around the one end of the objective shaft 19L and around the other end of the objective shaft 19R, respectively. The respective one ends of the objective springs 21 (L, R) are engaged with the objective lens frames 17 (L, R), respectively as well as the other ends thereof are engaged with the above T-shaped collars 20 which are fitted to the holes of the lens barrel main bodies 12 (L, R) (also see FIG. 12). With this arrangement, the objective springs 21 (L, R) apply moment forces about the objective shafts 19 (L, R) so as to urge the objective lens frames 17 (L, R) in the directions (the directions shown by arrows D, E of FIG. 11, respectively) where they are always abutted against stopper members 12aL, 12aR disposed to the bottom surface of the lens barrel main bodies 12 (L, R), respectively (see FIG. 8 and FIG. 11).

The objective lens frames 17 (L, R) are moved in the optical axis direction of the optical systems in association with a focal adjusting mechanism and a diopter adjusting mechanism to thereby execute focal adjustment and diopter adjustment.

The eye piece lens frames 22 (L, R) which arrange the lens barrel eye piece unit are fixed to the lens barrel main bodies 12 (L, R) by screws 41 to be described or the like on the backside or the pupil side thereof. The eye piece groups 23 (L, R) composed of a plurality of oval lenses and the like are held by the eye piece lens frames 22 (L, R) as well as visual field apertures 24 (L, R) are disposed to the eye piece lens frames 22 (L, R) on the front side thereof.

The pair of right and left lens barrels 11 (L, R) are slidably supported by a first guide shaft 25 and a second guide shaft 26 as guide members disposed in a direction perpendicular to the optical axes of the optical systems of the binoculars.

That is, the first guide shaft 25 passes through the holes 12 (dL, dR) of the pair of right and left lens barrels 11 (L, R), respectively and fitted to the holes 1a defined to both the side surfaces of the base plate 1, respectively. With this arrangement, the pair of right and left lens barrels 11 (L, R) are positioned with respect to the optical axis direction of both the right and left lens barrels 11 (L, R).

The second guide shaft 26 is fixed to the lens barrel main body 12L by being bonded thereto at an end thereof, whereas the other end thereof slidingly guides the lens barrel main body 12R.

The first guide shaft 25 and the second guide shaft 26 are disposed in parallel with each other in directions perpendicular to the optical axes of the optical systems.

Therefore, when the width between eyes is adjusted as described below, the pair of right and left lens barrels 11 (L, R) move along the first guide shaft 25 and the second guide shaft 26, so that the distance therebetween can be changed.

Figure 9:
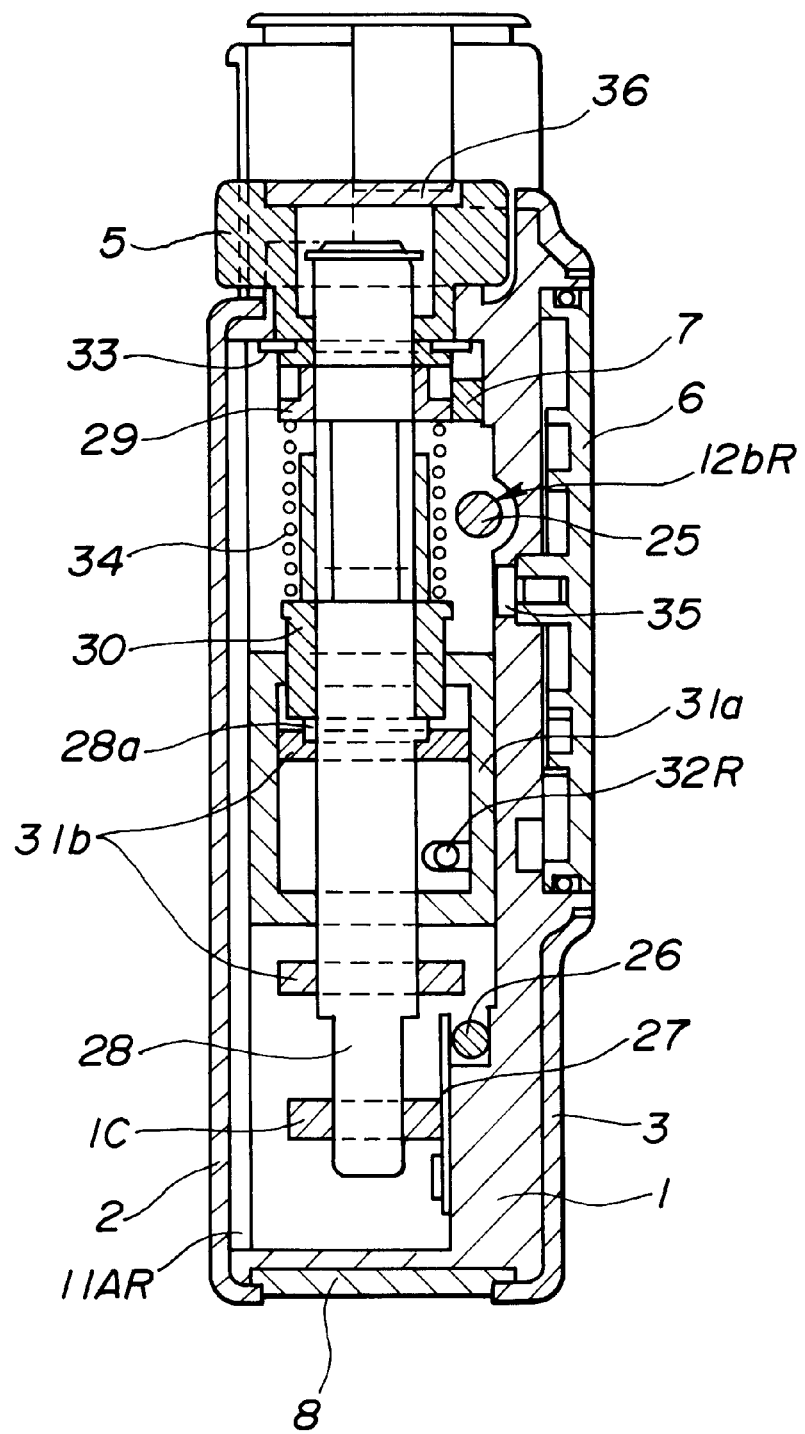
FIG. 9 is a longitudinal cross sectional view taken along the line 9—9 of FIG. 7.

Note, as shown in FIG. 9, the second guide shaft 26 is clamped between the base plate 1 and a second guide shaft press member 27, by which the rotation of the pair of right and left lens barrels 11 (L, R) about the first guide shaft 25 is prevented.

Figure 6:
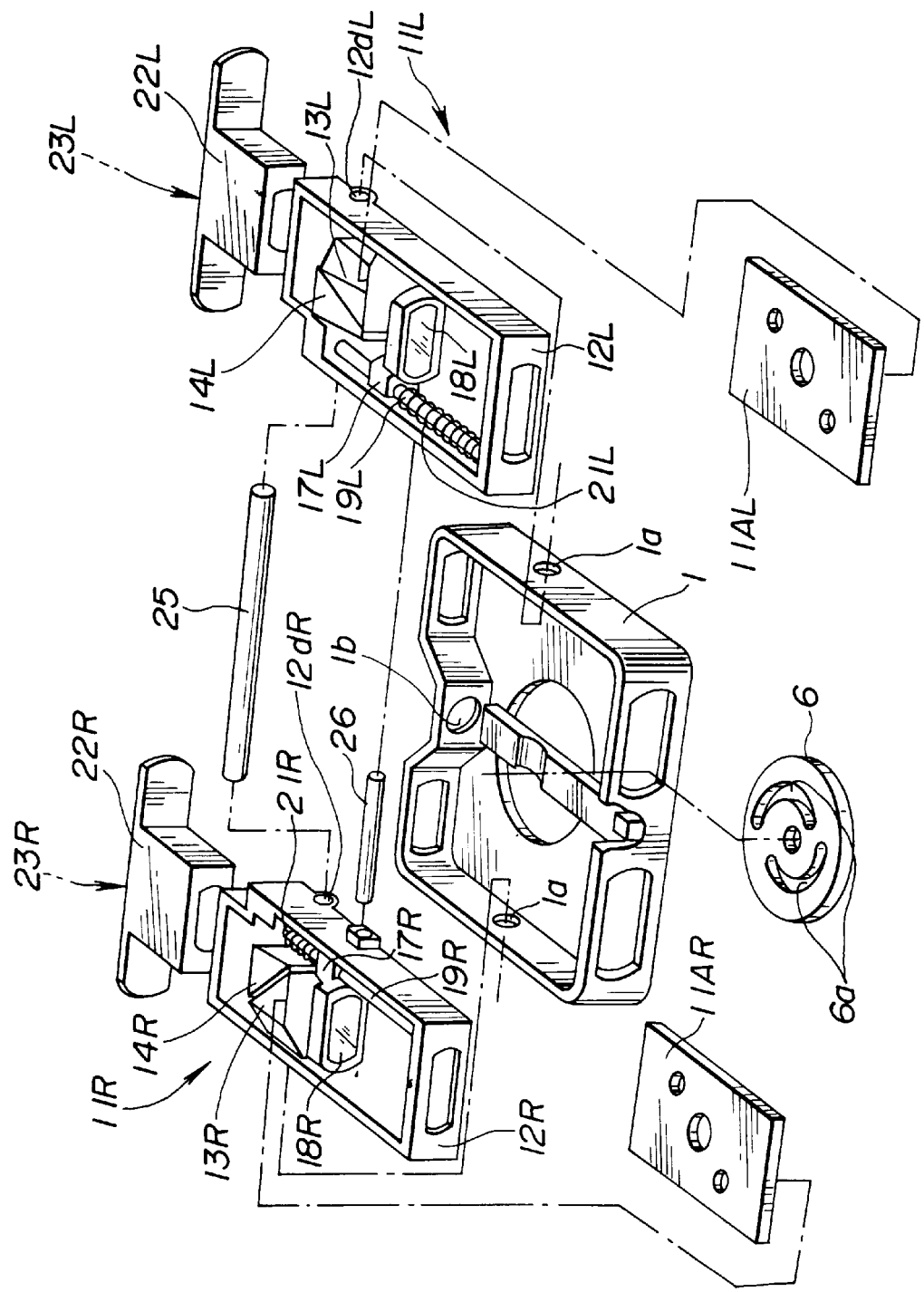
FIG. 6 is an exploded perspective view showing an inside mechanism of the binoculars of FIG. 1.

Note, numerals 11 (AL, AR) shown in FIG. 6 denote lid members for covering the upper surfaces of the lens barrel main bodies 12 (L, R) and the lid members 11 (AL, AR) are fixed on the upper surfaces of the lens barrel main bodies 12 (L, R) by screws or the like.

Next, the focal adjusting mechanism and a diopter adjusting mechanism of the binoculars will be described below.

Note, focal adjustment or diopter adjustment is executed by feeding in or feeding out the objective lens frames 17 (L, R) of the binoculars in the optical axis direction in the embodiment. A mechanism for feeding the objective lens frames 17 (L, R) is divided into two mechanisms of the diopter adjusting mechanism and the focal adjusting mechanism.

First, the diopter adjusting mechanism will be described below.

To adjust the diopter of the optical systems of the binoculars, a feeding mechanism as lens group moving means composed of an objective screw 28 and the like (see FIG. 7) disposed approximately at the center of the binoculars is actuated by sliding the diopter knob 7, by which only the right side objective lens frame 17R can be fed out or fed in.

Figure 7:
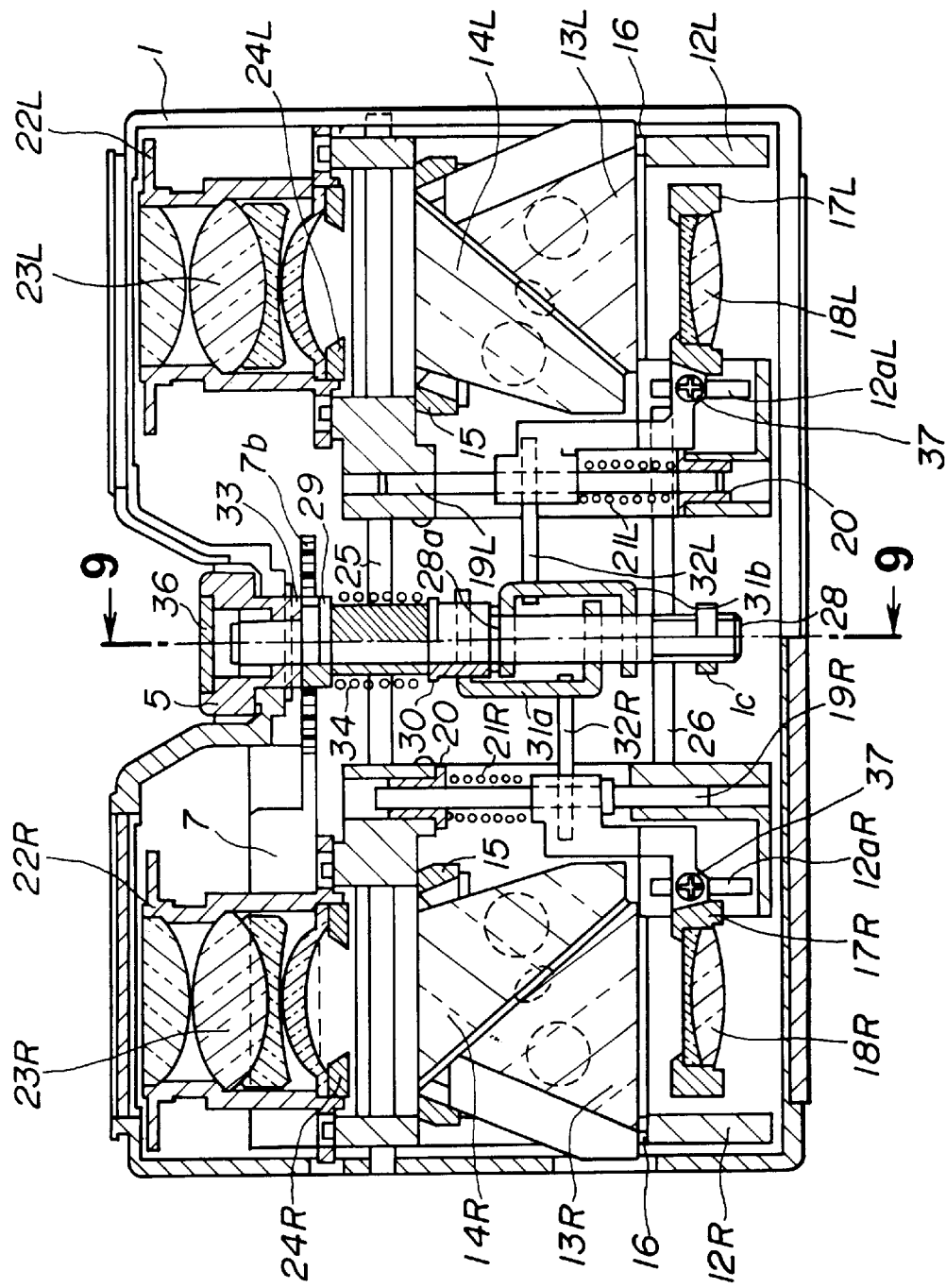
FIG. 7 is a lateral cross sectional view showing the inside mechanism of the binoculars of FIG. 1 from which an upper cover is removed.
Figure 10:
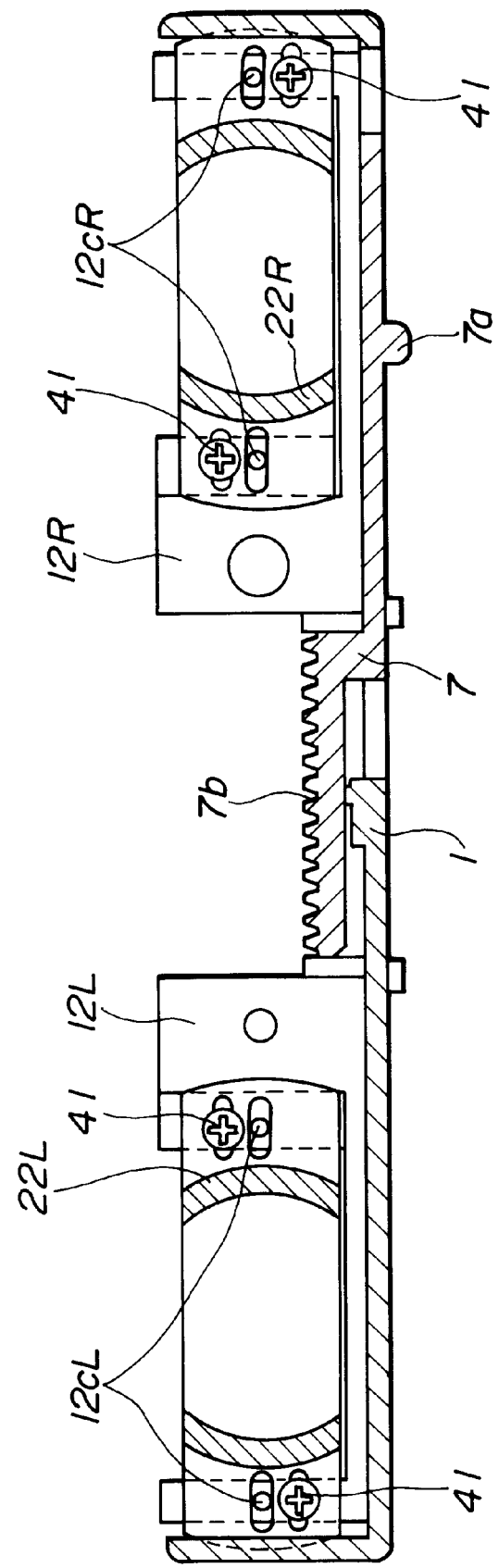
FIG. 10 is a longitudinal cross sectional view taken along the line 10—10 of FIG. 8.

That is, as shown in FIG. 10, the diopter knob 7 is composed of a member having an actuating portion 7a and a gear portion 7b which are formed integrally and the gear portion 7b is meshed with a diopter gear 29 which is threaded with the screw portion of the objective screw 28 constituting the feeding mechanism as shown in FIG. 7 and FIG. 9.

A diopter screw 30 is rotatably disposed on the middle of the objective screw 28 so as to slide in the optical axis direction, that is, along the axial direction of the objective screw 28.

A diopter spring 34 is disposed between the diopter gear 29 and the diopter screw 30 in the state that it receives the objective screw 28 and engaged with the diopter gear 29 and the diopter screw 30 at respective ends thereof. With this arrangement, the diopter spring 34 constantly urges the diopter screw 30 to the front side (object side) of the binoculars as well as rotating the diopter screw 30 in association with the rotation of the diopter gear 29.

Note, a flange portion 28a is disposed at the middle of the objective screw 28 and the diopter screw 30 urged by the diopter spring 34 is abutted against the flange portion 28a to thereby lock the diopter screw 30 so that it does not move forward, by which a right arm member 31a to be described below is positioned at a predetermined location.

The right arm member 31a is threaded with the diopter screw 30 and an end of a shaft member 32R planted to the objective lens frame 17R is engaged with the right arm member 31a as shown in FIG. 7.

An objective spring 21R receives the objective shaft 19R between the T-shaped collar 20 which rotatably supports the one end of the objective shaft 19R and the objective lens frame 17R, by which the objective lens frame 17R and the right arm member 31a are constantly urged to the front side (object side) of the binoculars as well as the right arm member 31a is prevented from being loosely threaded with the objective screw 28.

With the above arrangement, when the gear portion 7b is moved by actuating the actuating portion 7a of the diopter knob 7, the diopter gear 29 meshed with the gear portion 7b thereof is rotated, by which the diopter gear 29 is moved while rotating in the axial direction the objective screw 28 against the urging force of the diopter spring 34. Then, the diopter screw 30 is also moved in the same direction through the diopter spring 34. The right arm member 31a is moved in the optical axis direction by the above rotation, so that only the objective lens frame 17R is moved in the optical axis direction. The diopter adjustment is executed as described above.

Next, the focal adjusting mechanism will be described below.

As shown in FIG. 7 and FIG. 9, the distance adjusting knob 5 is inserted into the hole 1b defined to the base plate 1 approximately at the middle on the backside (pupil side) thereof (see FIG. 6) and a C-ring 33 is fitted to the peripheral groove on the outer periphery of the distance adjusting knob 5 in this state. This arrangement prevents the distance adjusting knob 5 from being removed from the base plate 1 as well as the distance adjusting knob 5 being free to rotate with respect to the base plate 1.

A screw portion formed to an end (rear end) of the objective screw 28 is disposed at a position corresponding to the hole 1b in the base plate 1 of the binoculars and threaded with the screw portion formed to the inner periphery of the distance adjusting knob 5.

The other end of (object side) of the objective screw 28 has an oval shape and is fitted to the hole of the same shape defined to a fixing member 1c of the base plate 1 to thereby support the objective screw 28 so that it does not rotate and permits the objective screw 28 to slide in the optical axis direction.

A left arm member 31b is fixed to the objective screw 28 at a position where it does not interfere with the right arm member 31a and an end of a shaft member 32L planted to the objective lens frame 17L engages the left arm member 31b similar to the right arm member 31a.

An objective spring 21L receives the objective shaft 19L between the T-shaped collar 20 which rotatably supports the one end of the objective shaft 19L and the objective lens frame 17L. The left arm member 31b is constantly urged to the rear side (pupil side) of the binoculars, by which the left arm member 31b is positioned by being abutted against the flange unit.

With this arrangement, when the distance adjusting knob 5 rotates, the objective screw 28 is slid in the optical axis direction without being rotated, whereby the feeding-out/in operation thereof is executed, so that the left arm member 31b is moved in the optical axis direction in association with the above operation to thereby move the objective lens frame 17L in the optical axis direction.

Since the flange portion 28a is also moved forward by the movement of the objective screw 28 in the optical axis direction, the objective lens frame 17R and the right arm member 31a locked by the flange portion 28a are also moved in the same direction at the same time. Thus, since the objective lens frames 17 (L, R) are moved together in the same direction (optical axis direction) in association with each other, they are simultaneously fed out or in by the same amount. Focal adjustment is executed as described above.

Note, at the time, as the objective screw 28 moves in the optical axis direction, the diopter gear 29 is also moved in the same direction to thereby compress the diopter spring 34. However, since the diopter screw 30 is locked by the flange portion and further the diopter gear 29 is moved without being rotated, the movement of the objective screw 28 in the optical axis direction does not affect the relative positional relationship between the objective lens frame 17R and the objective screw 28.

The diopter gear 29 meshed with the gear portion 7b of the diopter knob 7 is not removed therefrom by the movement of the diopter gear 29 and they are meshed with each other at all times.

The width between eyes is adjusted in the binoculars by changing the interval between the pair of right and left lens barrels 11 (L, R) by rotating the width-between-eyes adjusting knob 6. The width-between-eyes adjusting mechanism will be described below.

Figure 8:
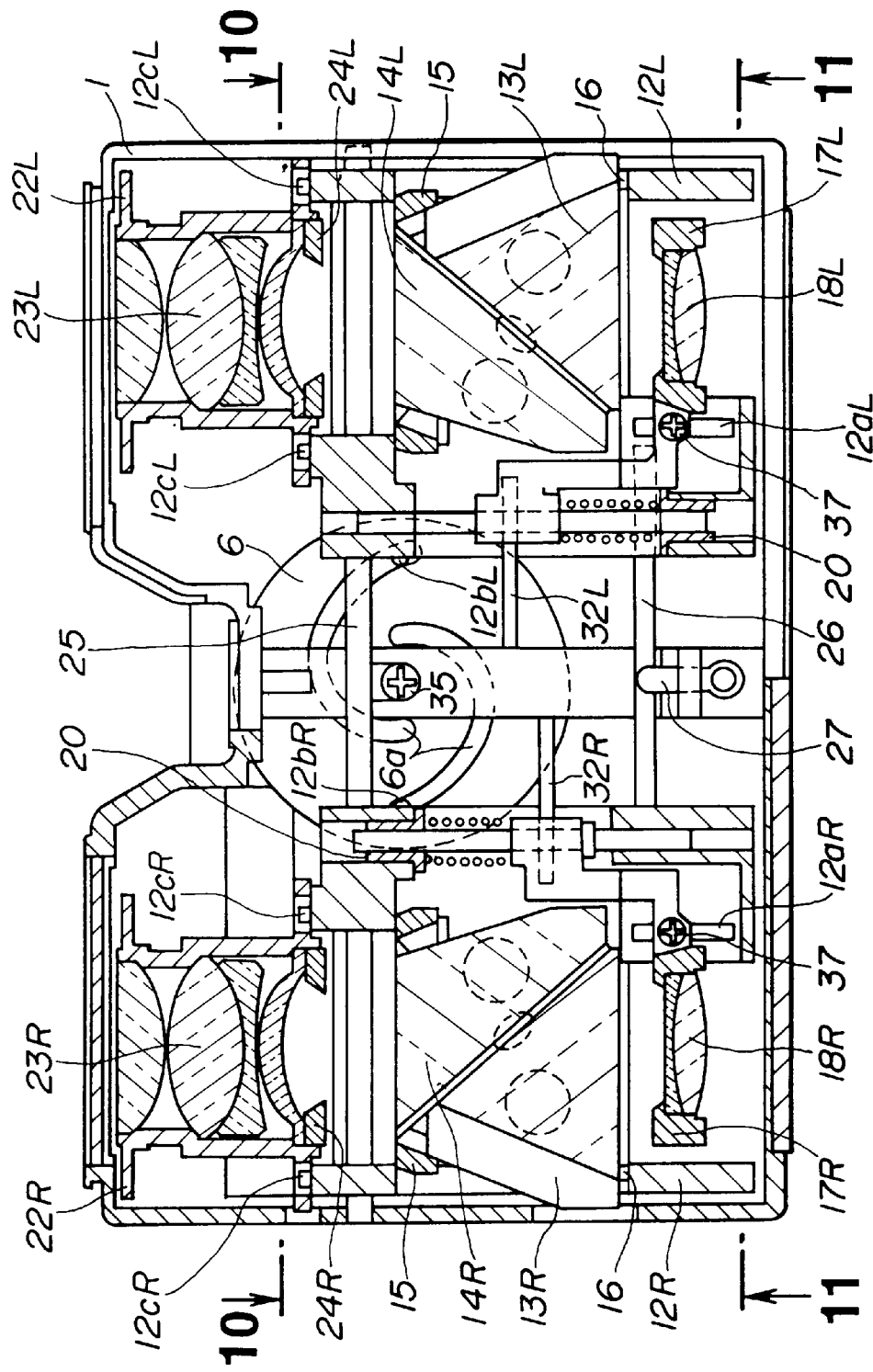
FIG. 8 is a lateral cross sectional view of the binoculars of FIG. 1 from which the upper cover is removed and further a feeding mechanism is removed.

As shown in FIG. 8 and FIG. 9, the width-between-eyes adjusting knob 6 is supported by a screw 35 so as to rotate with respect to the base plate 1. Two cam grooves 6a are formed in the width-between-eyes adjusting knob 6 and cam follower pins 12b (L, R) which are planted on the bottom surface of the lens barrel main bodies 12 (L, R) and extend downward, each respectively engage the cam grooves 6a, 6a.

With this arrangement, when the width-between-eyes adjusting knob 6 is rotated, the cam follower pins 12b (L, R) move along the cam grooves 6a and the lens barrel main bodies 12 (L, R) are moved in association with the movement of the cam follower pins 12b. At the time, since the lens barrels 11 (L, R) including the lens barrel main bodies 12 (L, R) are held so as to slide in the direction perpendicular to the optical axis of the optical systems by the two guide shafts, i.e. the first guide shaft 25 and the second guide shaft 26 as described above, the lens barrels 11 (L, R) are moved in the direction to approach each other and separate from each other by selective rotation of the width-between-eyes adjusting knob 6.

Next, optical axis adjusting mechanisms of the binoculars will be described below.

The optical axis adjusting mechanisms of the binoculars independently execute the adjustment of the optical axis in the upward/downward direction with respect to the main body and the adjustment thereof in the right/left direction with respect to the main body on the plane approximately vertical to the optical axis, i.e. on the plane perpendicular to the optical axis.

First, the optical axis adjusting mechanism of the optical axis in the upward/downward direction with respect to the main body on the plane perpendicular to the optical axis will be described.

Figure 11:
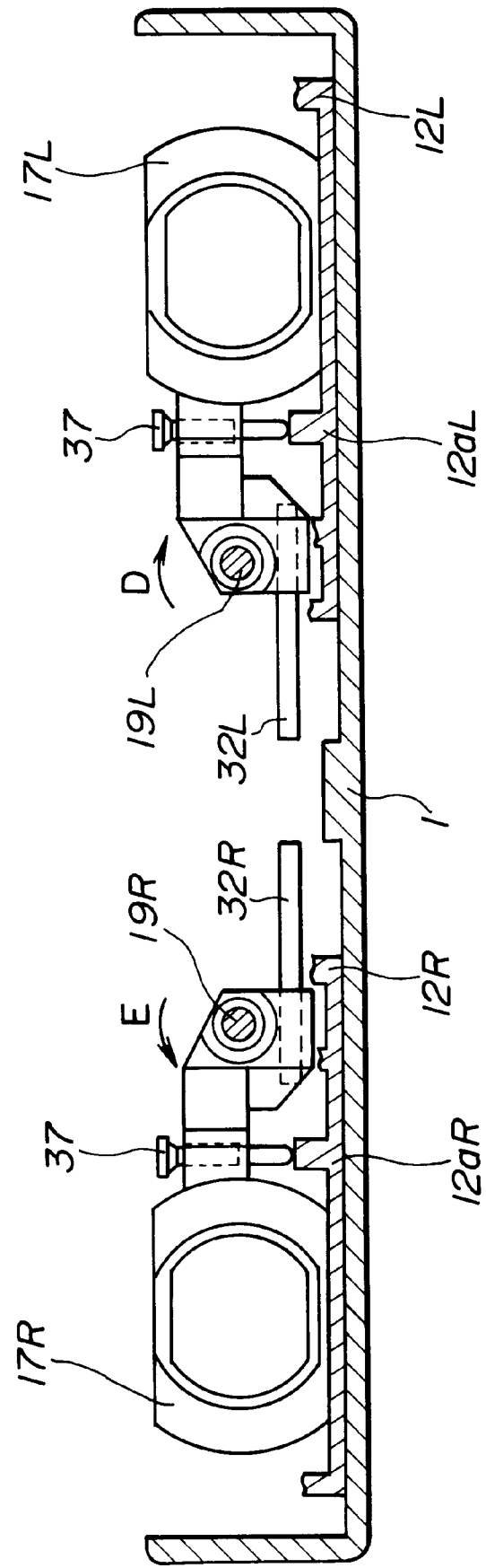
FIG. 11 is a longitudinal cross sectional view taken along the line 11—11 of FIG. 8.

As shown in FIG. 11, optical axis adjusting screws 37 as adjusting means each partially formed to a screw shape are disposed on the objective lens frames 17 (L, R) and abutted against stopper members 12a (L, R) disposed on the bottom surface of the lens barrel main bodies 12 (L, R) at the extreme ends thereof. Then, the objective lens frames 17 (L, R) can be rotated about the objective shafts 19 (L, R) as the centers of rotation, respectively by rotating the optical axis adjusting screws 37. With this arrangement, the optical axis can be adjusted in the upward/downward direction on the plane perpendicular to the optical axis.

Figure 12:
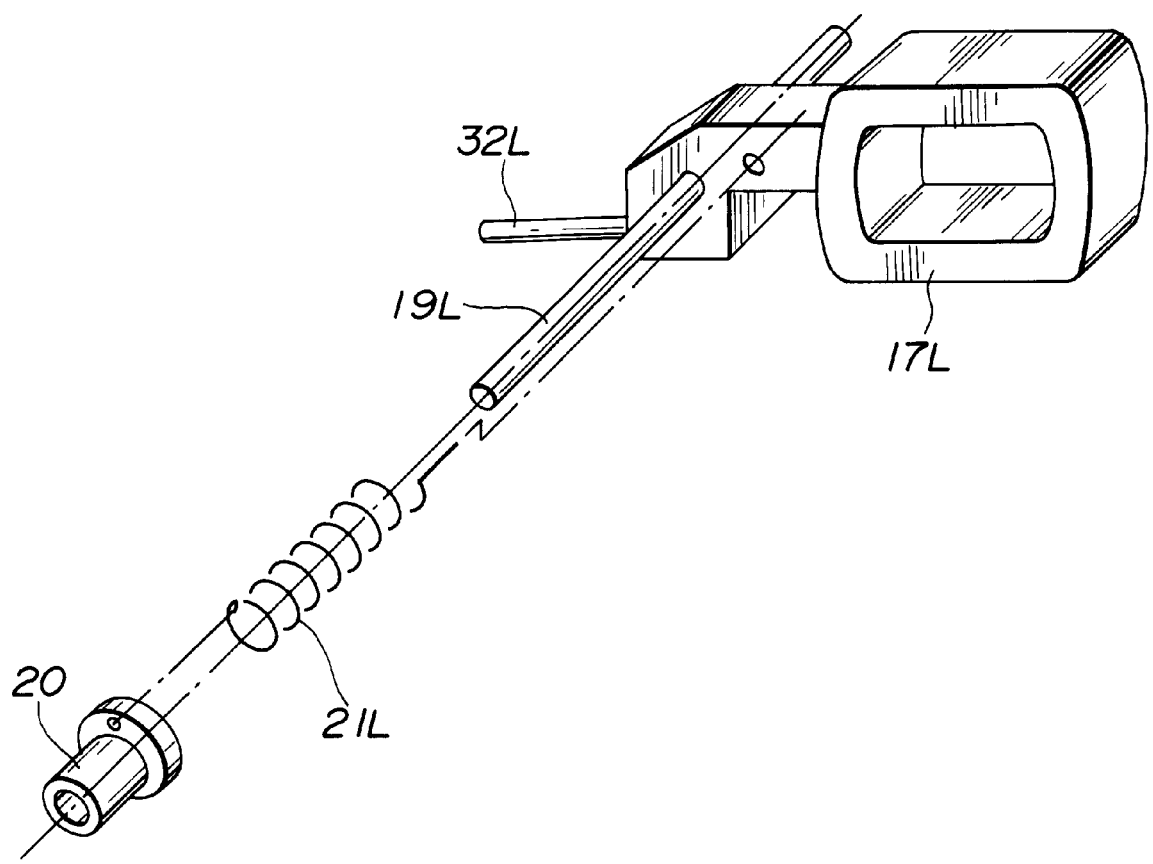
FIG. 12 is an exploded perspective view showing an objective lens frame taken out from the binoculars of FIG. 1.

Note, as described above, the objective springs 21 (L, R) each receive one of the objective shafts 19 as shown in FIG. 12. The objective springs 21 (L, R) are arranged as compression springs and torsion springs and urge the objective lens frames 17 (L, R) in the directions where they are constantly abutted against the stopper members 12a (L, R) of the lens barrel main bodies 12 (L, R) (the directions shown by arrows D and E in FIG. 11) to thereby position the objective lens frames 17 (L, R) at predetermined locations. With this arrangement, the optical axis of the binoculars is prevented from being changed in the upward/downward direction by the state of the binoculars itself, the focal adjustment, the diopter adjustment, the width-between eyes adjustment and the like.

Next, the optical axis adjusting mechanism of the binoculars in the right/left direction on the plane perpendicular to the optical axis will be described.

As shown in FIG. 10, two projections 12c (L, R) are planted to the lens barrel main bodies 12 (L, R), respectively toward the rear side (pupil side) in the optical axis direction and engaged with slots defined lengthwise in the right/left direction to the eye piece lens frames 22 (L, R), respectively.

With this arrangement, the sliding operation of the eye piece lens frames 22 (L, R) along the slots effected by sliding means (not shown, it may be effected manually or the like) permits the optical axis to be adjusted in the right/left direction on the plane perpendicular to the optical axis. In this case, after the completion of the optical axis adjustment in the right/left direction, the eye piece lens frames 22 (L, R) are positioned at predetermined locations by fixing the lens barrel main bodies 12 (L, R) and the eye piece lens frames 22 (L, R), each by two screws 41, respectively. With this arrangement, the optical axis of the binoculars is prevented from being changed by the state of the binoculars, the focal adjustment, the diopter adjustment, the width-between eyes adjustment and the like.

As described above, since the optical axis adjusting mechanisms of the binoculars independently adjust the upward/downward direction and the right/left direction with respect to the main body in the plane approximately perpendicular to the optical axis, a job for adjusting the optical axes of the pair of right and left lens barrels 11 (L, R) can be very easily executed with reduced man-hours.

Further, since a margin (amount of adjustment) for adjusting the optical axes can be suppressed to a minimum value by assembling the optical axis adjusting mechanisms into the pair of right and left lens barrels 11 (L, R), this arrangement can easily contribute to the miniaturization of the binoculars itself.

In this invention, it is apparent that working modes different in a wide range can be formed on the basis of this invention without departing from the spirit and scope of the invention. This invention in not restricted by any specific embodiment except as may be limited by the appended claims.

What is claimed is:

1. Binoculars capable of adjusting positions of objective lens groups and eye piece groups, comprising:
    a first supporting frame for supporting the objective lens groups;
    a second supporting frame for supporting the eye piece groups;
    a main body for holding said first and said second supporting frame;
    a shaft member disposed to said main body for rotatably holding one of said first supporting frame and said second supporting frame;
    a first adjusting member capable of adjusting a rotating position of one of said supporting frames with respect to said main body;
    a sliding plane portion forming a portion of said main body so that the other of said supporting frames slides approximately in parallel with a rotating plane formed by rotation of the one of said supporting frames; and
    a second adjusting member capable of adjusting a position of said another supporting frame with respect to said sliding plane portion.

2. Binoculars according to claim 1, wherein said shaft member rotatably supports said first supporting frame which supports the objective lens groups as well as supporting said first supporting frame so that the first supporting frame can slide along said shaft member.

3. Binoculars according to claim 2, wherein the objective lens groups supported by said first supporting frame also have a focusing function.

4. Binoculars according to claim 2, wherein said shaft member includes a spring member for urging said supporting frame, which supports the objective lens groups, in a rotating direction as well as in a sliding direction.

5. Binoculars according to claim 1, wherein said shaft member rotatably holds said first supporting frame which supports the objective lens groups, said first adjusting member includes a screw hole in said first supporting frame and a screw inserted into the screw hole for adjusting an abutting position of said first supporting frame with respect to said main body by rotating the screw.

6. Binoculars according to claim 1, wherein said shaft member rotatably supports said first supporting frame which supports the objective lens groups as well as supporting said first supporting frame so that it can slide along said shaft member and includes a spring member for urging said first supporting frame in a rotating direction as well as in a sliding direction and said first adjusting member is composed of a screw having an approximately spherical extreme end and a screw hole in said first supporting frame for adjusting an abutting position of said first supporting frame by rotating and moving the extreme end of said screw abutted against said main body.

7. Binoculars according to claim 6, wherein said screw is provided with a removal preventing unit for preventing removal of said screw from said screw hole.

8. Binoculars having a pair of observing optical systems disposed in parallel with a main body and at least including objective lens groups and eye piece groups, comprising:
    lens group moving means disposed to at least one of the observing optical systems for moving any one of groups of the objective lens groups and the eye piece groups in an upward/downward direction with respect to the main body and moving other groups in a right/left direction with respect to the main body as well as moving the objective lens groups and the eye piece groups independently; and
    adjusting means for independently adjusting positions of the objective lens groups and the eye piece groups which are moved by said lens group moving means; wherein the objective lens groups move in the upward/downward direction by being rotated with respect to a main body and the eye piece groups move in the right/left direction by being slidably moved with respect to the main body.

9. Binoculars having a pair of observing optical systems disposed in parallel with a main body and at least including objective lens groups and eye piece groups, comprising:
    lens group moving means disposed to at least one of the observing optical systems for moving any one of groups of the objective lens groups and the eye piece groups in an upward/downward direction with respect to the main body and moving other groups in a right/left direction with respect to the main body as well as moving the objective lens groups and the eye piece groups independently;
    adjusting means for independently adjusting positions of the objective lens groups and the eye piece groups which are moved by said lens group moving means; said adjusting means including:
        a first adjusting member capable of adjusting rotating positions of the objective lens groups;
        a sliding plane for permitting the eye piece groups to slide approximately in parallel with a virtual rotating plane formed by rotation of the objective lens groups; and
        a second adjusting member capable of adjusting positions of the eye piece groups with respect to the sliding plane.

10. Binoculars capable of adjusting optical axes of objective lens groups and eye piece groups, comprising composite lens groups each comprised of an objective lens group and an eye piece group, lens group moving means for moving one of said objective lens groups and eye piece groups in a direction approximately perpendicular to optical axes of the lens groups being moved and capable of moving the other of the lens groups independently of the moved lens groups, wherein the other of the lens groups are moved in a direction approximately perpendicular to a moving direction of the first moved lens groups, said objective lens groups being movable in a direction along their respective optical axes; and
    resilient bias means for each objective lens group for simultaneously normally urging its associated objective lens group in a given direction along said optical axis and in a given direction substantially perpendicular to said optical axis.

11. Binoculars according to claim 10 wherein said spring means is a helical spring.

12. Binoculars having a pair of observing optical systems disposed in parallel with a main body and at least including objective lens groups and eye piece groups, comprising:

lens group moving means disposed to at least one of the observing optical systems for moving any one of groups of the objective lens groups and the eye piece groups in an upward/downward direction with respect to the main body and moving other groups in a right/left direction with respect to the main body as well as moving the objective lens groups and the eye piece groups independently; and adjusting means for independently adjusting positions of the objective lens groups and the eye piece groups which are moved by said lens group moving means; said moving means moving the objective lens groups in the upward/downward direction by rotating the objective lens groups with respect to a main body, and moving the eye piece groups in the right/left direction by sliding the eye piece groups with respect to the main body.

* * * * *

UNITED STATES PATENT AND TRADEMARK OFFICE
CERTIFICATE OF CORRECTION

PATENT NO : 5,903,387
DATED : May 11, 1999
INVENTOR(S) : Tomikawa et al

It is certified that error appears in the above-identified patent and that said Letters Patent are hereby corrected as shown below:

At column 1, line 19, delete the word "bide" and insert therefor -- side--.

Signed and Sealed this

Fifteenth Day of May, 2001

*Attest:*

NICHOLAS P. GODICI

*Attesting Officer*      *Acting Director of the United States Patent and Trademark Office*